(12) United States Patent
Tour et al.

(10) Patent No.: US 10,053,366 B2
(45) Date of Patent: *Aug. 21, 2018

(54) METHODS OF CONTROLLABLY FORMING BERNAL-STACKED GRAPHENE LAYERS

(71) Applicant: William Marsh Rice University, Houston, TX (US)

(72) Inventors: James M. Tour, Bellaire, TX (US); Zhengzong Sun, El Cerrito, CA (US); Abdul-Rahman O. Raji, Houston, TX (US)

(73) Assignee: WILLIAM MARSH RICE UNIVERISITY, Houston, TX (US)

( * ) Notice: Subject to any disclaimer, the term of this patent is extended or adjusted under 35 U.S.C. 154(b) by 842 days.

This patent is subject to a terminal disclaimer.

(21) Appl. No.: 14/104,588

(22) Filed: Dec. 12, 2013

(65) Prior Publication Data

US 2014/0178688 A1 Jun. 26, 2014

Related U.S. Application Data

(60) Provisional application No. 61/736,249, filed on Dec. 12, 2012.

(51) Int. Cl.
*C23C 16/26* (2006.01)
*C01B 31/04* (2006.01)
*C01B 32/186* (2017.01)

(52) U.S. Cl.
CPC ........ *C01B 31/0453* (2013.01); *C01B 32/186* (2017.08); *C01B 2204/04* (2013.01); *Y10T 156/10* (2015.01); *Y10T 428/30* (2015.01)

(58) Field of Classification Search
CPC .. C23C 16/0209; C23C 16/0227; C23C 16/26
See application file for complete search history.

(56) References Cited

U.S. PATENT DOCUMENTS

| 2010/0258786 A1* | 10/2010 | Wang ................ H01L 21/02378 257/29 |
| 2012/0225296 A1* | 9/2012 | Zhong .................... B82Y 30/00 428/408 |

(Continued)

OTHER PUBLICATIONS

Luo, Zhengtang, et al., "Effect of Substrate Roughness and Feedstock Concentration on Growth of Wafer-Scale Graphene at Atmospheric Pressure". Chemistry of Materials, 2011, 23, 1441-1447.*

(Continued)

*Primary Examiner* — Bret P Chen
(74) *Attorney, Agent, or Firm* — Winstead PC

(57) ABSTRACT

Methods of controllably forming Bernal-stacked graphene layers are disclosed. The methods comprise: (1) cleaning a surface of a catalyst; (2) annealing the surface of the catalyst; (3) applying a carbon source onto the cleaned and annealed surface of the catalyst in a reaction chamber; and (4) growing the Bernal-stacked graphene layers on the surface of the catalyst in the reaction chamber, where the number of formed Bernal-stacked graphene layers is controllable as a function of one or more growth parameters, such as a total pressure of the reaction chamber. Further embodiments of the present disclosure also include steps of: (5) terminating the growing step; and (6) transferring the formed Bernal-stacked graphene layers from the surface of the catalyst onto a substrate.

33 Claims, 18 Drawing Sheets

(56) References Cited

U.S. PATENT DOCUMENTS

| | | | | |
|---|---|---|---|---|
| 2013/0001515 | A1* | 1/2013 | Li | H01L 21/0242 257/24 |
| 2013/0223166 | A1* | 8/2013 | Schuette | G11C 7/00 365/189.16 |
| 2014/0014030 | A1* | 1/2014 | Tour | C30B 25/186 117/97 |
| 2014/0120270 | A1* | 5/2014 | Tour | C23C 16/26 427/596 |
| 2014/0332915 | A1* | 11/2014 | Kelber | H01F 41/32 257/421 |

OTHER PUBLICATIONS

Sun, Zhengzong, et al., "Large-Area Bernal-Stacked Bi-, Tri-, and Tetralayer Graphene". ACSNANO, vol. 6 No. 11, 9790-9796, 2012.*

Yan, Kai, et al., "Formation of Bilayer Bernal Graphene: Layer-by-Layer Epitaxy via Chemical Vapor Deposition". NanoLetters, 2011, 11, 1106-1110.*

Hao, Yufeng, et al., "Oxygen-activated growth and bandgap tunability of large single-crystal bilayer graphene". Nature Nanotechnology, vol. 11, May 2016, pp. 426-432.*

Madito, M.J., et al., "A wafer-scale Bernal-stacked bilayer graphene film obtained on a dilute Cu (0.61 at% Ni) foil using atmospheric pressure chemical vapour deposition". RSC Advances, 2016, 6, 283770-283778.*

Lam, Kai-Tak, et al., "Bilayer graphene nanoribbon nanoelectromechanical system device: A computational study". Applied Physics Letters 95, 143107 (2009), pp. 1-3.*

Oostinga, J. B.; Heersche, H. B.; Liu, X.; Morpurgo, A. F.; Vandersypen, L. M. K. Gate-Induced Insulating State in Bilayer Graphene Devices. *Nature Mater.* 2007, 7, 151-157.

Yu, Q.; Jauregui, L. A.; Wei, W.; Colby, R.; Tian, J.; Su, Z.; Cao, H.; Liu, Z.; Pandey, D.; Wei, D. et al. Control and Characterization of Individual Grains and Grain Boundaries in Graphene Grown by Chemical Vapour Deposition. *Nat. Mater.* 2011, 10, 443-449.

Li, X.; Magnuson, C. W.; Venugopal, A.; An, J.; Suk, J. W.; Han, B.; Borysiak, M.; Cai, W.; Velamakanni, A.; Zhu, Y.; et al. Graphene Films with Large Domain Size by a Two-Step Chemical Vapor Deposition Process. *Nano Lett.* 2010, 10, 4328-4334.

Lee, S.; Lee, K.; Zhong, Z. Wafer Scale Homogeneous Bilayer Graphene Films by Chemical Vapor Deposition. *Nano Lett.* 2010, 10, 4702-4707.

Yacoby, A. Graphene: Tri and Tri Again. *Nature Physics* 2011, 7, 925-926.

Malard, L. M.; Pimenta, M. A.; Dresselhaus, G.; Dresselhaus, M. S. Raman Spectroscopy in Graphene. *Physics Report* 2009, 473, 51-87.

Horiuchi, S.; Gotou, T.; Fujiwara, M.; Sotoaka, R.; Hirata, M.; Kimoto, K.; Asaka, T.; Yokosawa, T.; Matsui, Y.; Kenji, W.; et al. Carbon Nanofilm with a New Structure and Property. *Jpn. J. Appl. Phys.* 2003, 42, 1073-1076.

Chen, S.; Cai, W.; Piner, R. D.; Suk, J. W.; Wu, Y.; Ren, J.; Kang, J.; Ruoff, R. S. Synthesis and Characterization of Large-Area Graphene and Graphite Films on Commercial Cu—Ni Alloy Foils. *Nano Lett.* 2011, 11, 3519-3525.

Shih, C. J.; Vijayaraghavan, A.; Krishnan, R.; Sharama, R.; Han, J.; Ham, M.; Jin, Z.; Lin, S.; Paulus, G. L. C.; Reuel, N. F. et al. Bi- and Trilayer Graphene Solutions. *Nature Nanotech.* 2011, 6, 439-445.

Yan, Z.; Lin, J.; Peng, Z.; Sun, Z.; Zhu, Y.; Li, L.; Xiang, C.; Samuel, E. L.; Kittrell, C.; Tour, J. M. Towards the Synthesis of Wafer-Scale Single-Crystal Graphene on Copper Foils. *ACS Nano* 2012, 6, 9110-9117.

Charlier, J. C.; Amara, H.; Lambin, P. Catalytically Assisted Tip Growth Mechanism for Single-Wall Carbon Nanotubes. *ACS Nano* 2007, 1, 202-207.

Bonaccorso, F.; Sun, Z.; Hasan, T.; Ferrari, A. C. Graphene Photonics and Optoelectronics. *Nature Photonics* 2010, 4, 611-622.

Reina, A.; Jia, X.; Ho, J.; Nezich, D.; Son, H.; Bulovic, V.; Dresselhaus, M. S.; Kong, J. Large Area, Few-Layer Graphene Films on Arbitrary Substrates by Chemical Vapor Deposition. *Nano Lett.* 2009, 9, 30-35.

Kim, K. S.; Zhao, Y.; Jang, H.; Lee, S. Y.; Kim, J. M.; Kim, K. S.; Ahn, J.; Kim, P.; Choi, J.; Hong, B. H. Large-Scale Pattern Growth of Graphene Film for Stretchable Transparent Electrodes. *Nature* 2009, 457, 706-710.

Li, X.; Cai, W.; An, J.; Kim, S.; Nah, J.; Yang, D.; Piner, R.; Velamakanni, A.; Jung, I.; Tutuc, E. et al. Large-Area Synthesis of High-Quality and Uniform Graphene Films on Copper Foils. *Science* 2009, 324, 1312-1314.

Craciun, M. F.; Russo, S.; Yamamoto, M.; Oostinga, J. B.; Morpurgo, A. F.; Tarucha, S. Trilayer Graphene is a Semimetal with a Gate-Tunable Band Overlap. *Nature Nanotech.* 2009, 4, 383-388.

Zhang Y.; Tang, T.; Girit, C.; Hao, Z.; Martin, M. C.; Zettl, A.; Crommie, M. F.; Shen, Y. R.; Wang, F. Direct Observation of a Widely Tunable Bandgap in Bilayer Graphene. *Nature* 2009, 459, 820-823.

Bhaviripudi, S.; Jia, X.; Dresselhaus, M. S.; Kong, J. Role of Kinetic Factors in Chemical Vapor Deposition Synthesis of Uniform Large Area Graphene Using Copper Catalyst. *Nano Lett.* 2010, 10, 4128-4133.

Sun, Z.; Yan, Z.; Yao, J.; Beitler, E.; Zhu, Y.; Tour, J. M. Growth of Graphene from Solid Carbon Sources. *Nature* 2010, 468, 549-552.

Ferrari, A. C.; Meyer, J. C.; Scardaci, V.; Casiraghi, C.; Lazzeri, M.; Mauri, F.; Piscanec, S.; Jiang, D.; Novoselov, K. S.; Roth, S.; et al. Raman Spectrum of Graphene and Graphene Layers. *Phys. Rev. Lett.* 2006, 97, 187401.

Ni, Z. H.; Wang, H. M.; Kasin, J.; Fan, H. M.; Yu, T.; Wu, Y. H.; Feng, Y. P.; Shen, Z. X. Graphene Thickness Determination Using Reflection and Contrast Spectroscopy. *Nano Lett.* 2007, 7, 2758-2763.

Yoon, D.; Moon, H.; Cheong, H. Variations in the Raman Spectrum as a Function of the Numbrer of Graphene Layers. *J. Korean Phys. Soc.* 2009, 55, 1299-1303.

Hao, Y. F.; Wang, Y.; Wang, L.; Ni, Z.; Wang, Z.; Wang, R.; Koo, C. K.; Shen, Z.; Thong, J. T. L. Probing Layer Number and Stacking Order of Few-Layer Graphene by Raman Spectroscopy. *Small* 2010, 6, 195-200.

Lui, C. H.; Li, Z.; Chen, Z.; Klimov, P. V.; Brus, L. E.; Heinz, T. Imaging Stacking Order in Few-Layer Graphene. *Nano Lett.* 2011, 11, 164-169.

Bae, S.; Kim, H.; Lee, Y.; Xu, X.; Park, J.; Zheng, Y.; Balakrishnan. J.; Lei, T.; Kim, H. R.; Song, Y. I. et al. Roll-to-Roll Production of 30-inch Graphene Films for Transparent Electrodes. *Nature Nanotech.* 2010, 5, 574-578.

Ohta, T.; Bostwick, A.; Seyller, T.; Horn, K.; Rotenberg, E. Controlling the Electronic Structure of Bilayer Graphene. *Science* 2006, 313, 951-954.

\* cited by examiner

US 10,053,366 B2

METHODS OF CONTROLLABLY FORMING BERNAL-STACKED GRAPHENE LAYERS

CROSS-REFERENCE TO RELATED APPLICATIONS

This application claims priority to U.S. Provisional Patent Application No. 61/736,249, filed on Dec. 12, 2012. The entirety of the aforementioned application is incorporated herein by reference.

STATEMENT REGARDING FEDERALLY FUNDED RESEARCH

This invention was made with government support under Office of Naval Research Grant No. N00014-09-1-1066; Air Force Office of Scientific Research Grant No. FA9550-12-1-0035; and Air Force Office of Scientific Research Grant No. FA9550-09-1-0581, all awarded by the U.S. Department of Defense. The government has certain rights in the invention.

BACKGROUND

Current methods of making Bernal-stacked graphene layers suffer from numerous limitations, including scalability, uniformity, and the ability to control the number of formed Bernal-stacked graphene layers. Therefore, a need exists for more effective, controllable and scalable methods of making Bernal-stacked graphene layers with a predominance of a prescribed number of desired graphene layers.

BRIEF SUMMARY

In some embodiments, the present disclosure pertains to methods of controllably forming Bernal-stacked graphene layers. In some embodiments, the methods comprise: (1) cleaning a surface of a catalyst; (2) annealing the surface of the catalyst; (3) applying a carbon source onto the cleaned and annealed surface of the catalyst in a reaction chamber; and (4) growing the Bernal-stacked graphene layers on the surface of the catalyst in the reaction chamber, where the number of formed Bernal-stacked graphene layers are controllable as a function of one or more growth parameters. Further embodiments of the present disclosure also include steps of: (5) terminating the growing step; and (6) transferring the formed Bernal-stacked graphene layers from the surface of the catalyst onto a substrate.

In some embodiments, the reaction chamber may be placed under a stream of a reductive gas (e.g., hydrogen) during the applying and growing steps. In some embodiments, the reductive gas has a pressure ranging from about 5 Torr to about 800 Torr in the reaction chamber.

In some embodiments, the catalyst is a copper foil. In some embodiments, the catalyst has a surface area ranging from about 1 cm$^2$ to about 10 m$^2$.

In some embodiments, the carbon source is a hydrocarbon, such as methane. In some embodiments, the applying of the carbon source onto a surface of the catalyst occurs by chemical vapor deposition. In some embodiments, the carbon source has a pressure ranging from about 0.2 Torr to about 30 Torr in the reaction chamber.

In some embodiments, the growing of the Bernal-stacked graphene layers occurs at temperatures of at least about 1,000° C. In some embodiments, the growing occurs while the reaction chamber has a total pressure ranging from about 5 Torr to about 800 Torr. In some embodiments, the growing occurs for less than about 15 minutes. In some embodiments, the growing occurs from multiple growth centers, where the growth centers comprise multilayer graphene seeds, where the growth centers grow laterally and epitaxially, and where the growth centers merge seamlessly to form Bernal-stacked graphene layers.

In some embodiments, the methods of the present disclosure also include a step of controlling the number of formed Bernal-stacked graphene layers, where the controlling comprises adjusting or maintaining one or more growth parameters. In some embodiments, the one or more growth parameters is selected from the group consisting of total pressure of the reaction chamber, pressure of the carbon source in the reaction chamber, pressure of a reductive gas in the reaction chamber, a ratio of reductive gas pressure to carbon source pressure in the reaction chamber, a reductive gas flow rate in the reaction chamber, growth temperature, growth time, a cooling rate of the surface of the catalyst after the growing step, and combinations thereof.

In some embodiments, the formed Bernal-stacked graphene layers have from 2 to 10 Bernal-stacked graphene layers. In some embodiments, the formed Bernal-stacked graphene layers have more than 10 Bernal-stacked graphene layers. In some embodiments, the formed Bernal-stacked graphene layers are in polycrystalline form. In some embodiments, the Bernal-stacked graphene layers have domain sizes ranging from about 1 µm to about 5 µm. In some embodiments, the Bernal-stacked graphene layers are uniform in structure.

Further embodiments of the present disclosure pertain to Bernal-stacked graphene films that comprise a plurality of Bernal-stacked graphene layers. In some embodiments, the Bernal-stacked graphene layers are uniform in structure. In some embodiments, the Bernal-stacked graphene layers are in polycrystalline form. In some embodiments, the numbers of Bernal-stacked graphene layers desired can be selected based upon one or more growth parameters in a reaction chamber.

BRIEF DESCRIPTION OF THE FIGURES

FIG. 2A is a scheme of a CVD growth chamber where a needle valve is placed downstream between a quartz tube and a vacuum pump to control the total pressure of CH$_4$ and H$_2$. The ratio of the two gases is controlled using mass flow controllers at the source of each gas. The growth chamber is placed in a furnace heated at 1,000° C. The inset is the partial pressure of CH$_4$ correlated to the thickness of the graphene layers. The ratio between partial pressure of H$_2$ (P$_{H2}$) and CH$_4$ (P$_{CH4}$) in this system was set by fixing the flow rates. FIG. 2B shows a Raman evolution of graphene grown under increased CH$_4$ partial pressure (514 nm laser excitation). FIG. 2C shows the 2D peak position of the Raman spectra in FIG. 2B.

FIGS. 6A-C show representative SAED patterns from bi-, tri-, and tetralayer graphene samples, respectively. FIGS. 6D-F show the intensity profile from the SAED patterns in FIGS. 6A-C, respectively. FIGS. 6G-I show high resolution TEM (HR-TEM) of randomly chosen representative edges of bi-, tri-, and tetralayer graphene that shows two, three, or four layers of carbon, respectively. The scale bars in FIGS. 6G-I are 5 nm.

FIG. 8A shows the transmittance of bi-, tri-, and tetralayer graphene films obtained with visible-absorption spectroscopy on quartz substrates. The transmittance of graphene was measured at 550 nm. n L signifies the number of graphene layers. FIG. 8B shows an optical image of a trilayer graphene on 2.5×2.5 cm$^2$ quartz that indicates the uniformity of the film. The $I_G/I_{2D}$ Raman mapping of bilayer (FIG. 8C), trilayer (FIG. 8D) and tetralayer graphene (FIG. 8E) are also shown.

FIG. 11A shows an overlaid SEM and optical microscopy top-view image of a dual-gate bilayer graphene FET device (TG=top gate; G=bottom gate; S=source; D=drain). Scale bar is 10 μm. FIG. 11B shows a cross-sectional view of the bilayer graphene device. FIG. 11C shows graphene electrical conductance as a function of top gate voltage $V_t$ at different fixed bottom gate voltages $V_b$. The measurements were taken from −40 V to 40 V in $V_b$, with 20 V steps at 77 K.

FIG. 13A shows SEM image of bilayer graphene grown for 15 min. The scale bar is 1 mm. The $I_G/I_{2D}$ Raman spectral map (FIG. 13B) and the Raman spectrum (FIG. 13C) of bilayer graphene grown for 15 min are also shown.

FIG. 14A shows SEM image of bilayer graphene grown for 30 min. The scale bar is 1 mm. The $I_G/I_{2D}$ Raman spectral map (FIG. 14B) and the Raman spectrum (FIG. 14C) of bilayer graphene grown for 30 min are also shown. There was no change in thickness noted with the increased growth time.

FIG. 15A shows SEM image of graphene grown under monolayer conditions (15 min) followed by bilayers growth conditions (15 min). The scale bar is 1 mm. Also shown are the $I_G/I_{2D}$ Raman spectral map (FIG. 15B) and Raman spectrum (FIG. 15C) of graphene grown under monolayer conditions for 15 min and then bilayer conditions for another 15 min. There was no thickness change observed after the monolayer was obtained.

FIGS. 17A-B are different magnification SEM images of bilayer graphene seeds and islands after 2 min growth atop pre-polished and annealed Cu. The red arrow in FIG. 17B points to a graphene seed. This graphene seed is surrounded with graphene islands, which range from 100 nm to several μm in size (here, seeds are simply small islands). The scale bars in FIGS. 17A-B are 1 μm. FIG. 17C is a representative Raman spectrum of these bilayer graphene seeds and islands, which shows the same signature as its final bilayer film. Out of 10 random areas studied, 8 areas were bilayer while one area was monolayer and another was trilayer. This indicates that the seeds were mainly bilayer.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Graphene films with Bernal-stacked graphene layers are of particular interest due to their unique and tunable electronic structures. For instance, a synthetic method to produce such graphene films with precise and controllable thicknesses would be desirable for chemists and physicists to explore the promising electronic applications of these materials. However, until recently, most of the approaches for making Bernal-stacked graphene layers were based on micron-sized multilayer exfoliated graphene flakes, requiring a tedious process that is difficult to scale. As such, a need exists for more effective, controllable and scalable methods of making Bernal-stacked graphene layers. Various embodiments of the present disclosure address this need.

In some embodiments, the present disclosure pertains to methods of controllably forming Bernal-stacked graphene layers. Further embodiments of the present disclosure pertain to Bernal-stacked graphene films that comprise a plurality of Bernal-stacked graphene layers.

Methods of Controllably Forming Bernal Stacked Graphene Layers

Figure 1:
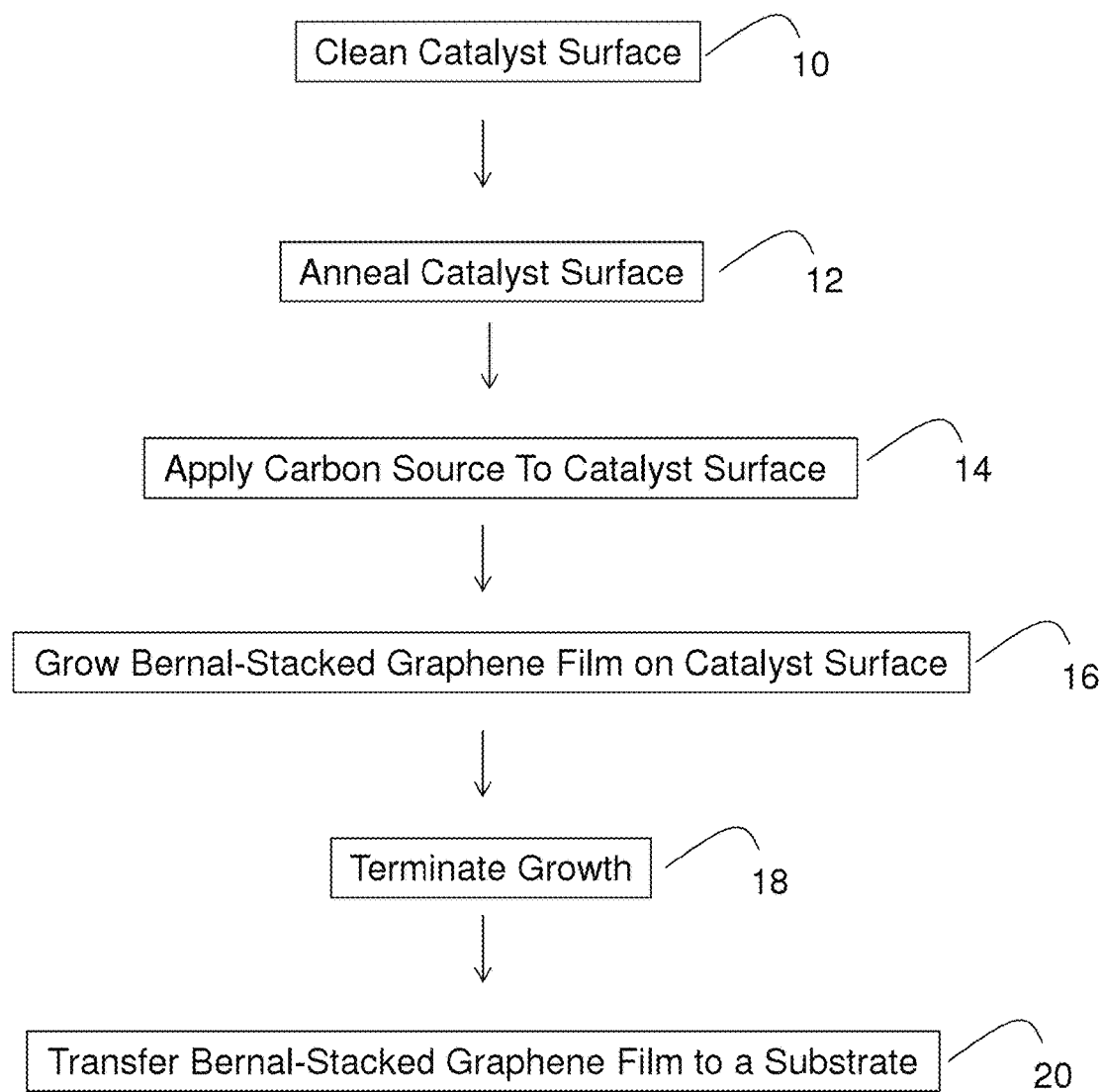
FIG. 1 provides a scheme of a method for making Bernal-stacked graphene layers.

In some embodiments, the present disclosure pertains to methods of controllably forming Bernal-stacked graphene layers. In some embodiments that are illustrated in the scheme in FIG. 1, the methods of the present disclosure include one or more of the following steps: cleaning a surface of a catalyst (step 10); annealing the surface of the catalyst (step 12); applying a carbon source onto the cleaned and annealed surface of the catalyst in a reaction chamber (step 14); and growing Bernal-stacked graphene layers on the surface of the catalyst in the reaction chamber (step 16). In some embodiments, the number of formed Bernal-stacked graphene layers is controllable as a function of one or more growth parameters. In some embodiments, the methods of the present disclosure also include one or more steps of: terminating the growth of the Bernal-stacked graphene layers (step 18) and transferring the formed Bernal-stacked graphene layers from the catalyst surface to a substrate (step 20).

As set forth in more detail herein, the methods of the present disclosure can have numerous embodiments and variations. For instance, various catalysts, carbon sources, and reaction conditions may be utilized to form various types of Bernal-stacked graphene layers in a scalable and controllable manner.

Catalysts

Various catalysts may be utilized to grow Bernal-stacked graphene layers. In some embodiments, the catalyst may include at least one of Ni, Co, Fe, Pt, Au, Al, Cr, Cu, Mg, Mn, Mo, Rh, Si, Ta, Ti, W, U, V, Zr, mixtures thereof, foils thereof, vapor deposited metals thereof, and combinations thereof. In some embodiments, the catalysts may include reduced metal catalysts, oxidized metal catalysts, associated alloys of metal catalysts, and combinations thereof. In more specific embodiments, the catalyst is a copper foil.

The catalysts of the present disclosure may also have various purities. For instance, in some embodiments, the catalysts of the present disclosure may have a purity of at least about 75%. In some embodiments, the catalysts of the present disclosure may have a purity of at least about 95%. In some embodiments, the catalysts of the present disclosure may have a purity of at least about 99%. In more specific embodiments, the catalyst is a copper foil with a purity above 99%.

The catalysts of the present disclosure may also be in various crystalline forms. For instance, in some embodiments, the catalysts of the present disclosure may be in monocrystalline form. In some embodiments, the catalysts of the present disclosure may be in polycrystalline form. In more specific embodiments, the catalysts of the present disclosure include polycrystalline copper foils.

The catalysts of the present disclosure may also have various shapes. For instance, in some embodiments, the catalysts of the present disclosure may be in the form of squares, rectangles, cylinders, circles, and the like. In some embodiments, the catalysts of the present disclosure may have at least one surface. In some embodiments, the catalysts of the present disclosure may have multiple surfaces.

The catalysts of the present disclosure may also various surface areas. For instance, in some embodiments, the catalysts of the present disclosure have a surface area ranging from about 1 cm$^2$ to about 10 m$^2$. In some embodiments, the catalysts of the present disclosure have a surface area of about 1 inch$^2$.

As also set forth in more detail herein, various methods may be utilized to clean and anneal catalyst surfaces. In some embodiments, such treatments can minimize carbon source contamination on a catalyst surface and thereby facilitate the growth of Bernal-stacked graphene layers on the catalyst surface.

Cleaning of Catalyst Surfaces

Various methods may be utilized to clean catalyst surfaces. For instance, in some embodiments, catalyst surfaces may be cleaned by treatment with one or more acids. In some embodiments, the one or more acids may include sulfuric acid, nitric acid, hydrochloric acid, acetic acid, diluted acids, and combinations thereof.

In some embodiments, the cleaning of the catalyst surface may include electrochemical-polishing of the surface of the catalyst. In some embodiments, the electrochemical-polishing may include applying a voltage to the catalyst surface and polishing the catalyst surface for a certain amount of time. For instance, in more specific embodiments, electrochemical polishing may include applying a voltage of about 0.5 V or higher to the surface of the catalyst, and polishing the surface of the catalyst for about 10 seconds or longer.

In some embodiments, the cleaning of catalyst surfaces may occur by mechanical polishing. Additional methods of cleaning catalyst surfaces can also be envisioned.

Annealing of Catalyst Surfaces

Various methods may also be used to anneal catalyst surfaces. For instance, in some embodiments, the annealing of catalyst surfaces includes thermal annealing. In some embodiments, thermal annealing includes exposure of a catalyst surface to temperatures of about 500° C. or higher. In some embodiments, thermal annealing includes exposure of a catalyst surface to temperatures of at least about 1,000° C.

In some embodiments, the annealing of catalyst surfaces may occur at various pressures. For instance, in some embodiments, the annealing of catalyst surfaces may occur at pressures that range from about 1 mTorr to about 1500 Torr. In some embodiments, the annealing of catalyst surfaces may occur at pressures that range from about 5 Torr to about 800 Torr. In some embodiments, the annealing of catalyst surfaces occurs at pressures of about 1000 Torr or higher. In some embodiments, the annealing of catalyst surfaces occurs at pressures at or above 1500 Torr.

In some embodiments, the annealing of catalyst surfaces may occur in a reductive environment. For instance, in some embodiments, the annealing of catalyst surfaces may occur under a stream of one or more reductive gases. In some embodiments, suitable reductive gases include one or more gases that can prevent oxidation by removing oxygen or other oxidizing agents from a reaction chamber. In some embodiments, the reductive gas includes, without limitation, hydrogen, carbon monoxide, hydrogen sulfide, and combinations thereof. In some embodiments, the reductive gas is hydrogen. In some embodiments, the annealing of catalyst surfaces may occur under a stream of a reductive gas at a flow rate of about 10-1000 standard cubic cm per minute (sccm). In more specific embodiments, the annealing of catalyst surfaces occurs under a stream of hydrogen gas at a flow rate of about 10 sccm.

The annealing of catalyst surfaces may also occur for various time periods. In some embodiments, the annealing of catalyst surfaces may last from about 1 minute to about 10 hours. In some embodiments, the annealing of catalyst surfaces may last for about 7 hours.

In more specific embodiments, the annealing of catalyst surfaces can involve exposure of a surface of a catalyst to a temperature of at least about 1000° C. and a pressure of at least about 1 mTorr for more than about 1 minute. In more specific embodiments, the annealing temperature is at least about 1000° C., the annealing pressure is at least about 5 Torr, and the annealing time is at least about 7 hours.

In some embodiments, the annealing of catalyst surfaces may occur under inert conditions, such as under a stream of one or more inert gases. In some embodiments, the one or more inert gases may include, without limitation, argon, nitrogen, and combinations thereof. In some embodiments, the annealing of catalyst surfaces may occur under inert and reductive conditions. For instance, in some embodiments, the annealing of catalyst surfaces may occur under streams of one or more inert gases (e.g., Ar, $N_2$, etc.) and one or more reductive gases (e.g., $H_2$). Additional methods of annealing catalyst surfaces can also be envisioned.

Application of Carbon Sources onto Catalyst Surfaces

Various methods may also be utilized to apply carbon sources to catalyst surfaces. In some embodiments, carbon sources are applied onto catalyst surfaces by spin-coating, drop-casting, spray coating, dip coating, physical application, vapor-coating, sublimation, blading, inkjet printing, screen printing, direct placement, thermal evaporation, chemical vapor deposition, and combinations thereof. In more specific embodiments, carbon sources are applied onto catalyst surfaces by chemical vapor deposition (CVD).

In addition, various carbon sources may be applied to catalyst surfaces. For instance, in some embodiments, the carbon sources may include at least one of hydrocarbons, polymers, non-polymeric carbon sources, small molecules, organic compounds, fullerenes, fluorenes, carbon nanotubes, phenylene, ethylenes, sucrose, sugars, polysaccharides, carbohydrates, proteins, and combinations thereof. In some embodiments, the carbon sources may include polymers, such as poly(methyl methacrylate)s, polystyrenes, polyacrylonitriles, polycarbonates, poly(phenylene ethylene)s, cellulose, and combinations thereof.

In more specific embodiments, the carbon sources that are applied to catalyst surfaces include hydrocarbons. In some embodiments, the hydrocarbons include, without limitation, $CH_4$, $C_2H_4$, $C_2H_2$, and combinations thereof. In some embodiments, the hydrocarbons include methane. In some embodiments, the carbon source is filtered methane with a chemical purity grade of more than 99%. In more specific embodiments, the applying of the carbon source onto a catalyst includes the application of hydrocarbons to the catalyst surface by CVD.

In some embodiments, carbon sources are applied to a cleaned and annealed surface of a catalyst in a gaseous state. In some embodiments, the carbon source is applied to a cleaned and annealed catalyst surface while the catalyst is in a reaction chamber. In some embodiments, the carbon source in the reaction chamber has a pressure ranging from about 0.2 Torr to about 30 Torr. In some embodiments, the carbon source in the reaction chamber has a flow rate that ranges from about 10 sccm to about 1,000 sccm. In more specific embodiments, the carbon source in the reaction chamber has a flow rate of about 10 sccm.

Growth of Bernal-stacked Graphene Layers

Growth of Bernal-stacked graphene layers on catalyst surfaces generally occurs during or after the application of a carbon source onto a catalyst surface. Various methods may also be utilized to grow various types of Bernal-stacked graphene layers on catalyst surfaces. In particular, various pressures, temperatures, growth times, and environmental conditions may be utilized to grow Bernal-stacked graphene layers on catalyst surfaces.

For instance, in some embodiments, the growth of Bernal-stacked graphene layers on catalyst surfaces occurs in a reductive environment. In some embodiments, the reductive environment may include a stream of a reductive gas, such as hydrogen. In some embodiments, the stream of the reductive gas may have a flow rate of about 10 sccm to about 1000 sccm. In more specific embodiments, growth of Bernal-stacked graphene layers on catalyst surfaces occurs under a stream of hydrogen gas at a flow rate of about 300 sccm.

The growth of Bernal-stacked graphene layers on catalyst surfaces may also occur at various pressures. For instance, in some embodiments, the growth of Bernal-stacked graphene layers on catalyst surfaces may occur in reaction chambers that have a total pressure that ranges from about 1 mTorr to about 1500 Torr. In more specific embodiments, the growth of Bernal-stacked graphene layers on catalyst surfaces occurs in a reaction chamber that has a total pressure that ranges from about 5 Torr to about 800 Torr. In some embodiments, the growth of Bernal-stacked graphene layers on catalyst surfaces occurs in a reaction chamber that has a total pressure of about 50 Torr.

The growth of Bernal-stacked graphene layers on catalyst surfaces may also occur at various temperatures. For instance, in some embodiments, the growth of Bernal-stacked graphene layers on catalyst surfaces occurs at temperatures of about 500° C. or higher. In some embodiments, the growth of Bernal-stacked graphene layers on catalyst surfaces occurs at temperatures of at least about 1000° C.

In addition, the growth of Bernal-stacked graphene layers on catalyst surfaces may occur for various time periods. For instance, in some embodiments, the growth of Bernal-stacked graphene layers on catalyst surfaces may last from about 1 minute to about 10 hours. In some embodiments, the growth of Bernal-stacked graphene layers on catalyst surfaces may last from about 2 minutes to about 15 minutes. In some embodiments, the growth of Bernal-stacked graphene layers on catalyst surfaces may occur for less than about 15 minutes. In some embodiments, the growth of Bernal-stacked graphene layers on catalyst surfaces may occur for about 2 minutes.

Reaction Chamber

The methods of the present disclosure may occur in various reaction chambers. In some embodiments, the reaction chamber may be a tube, such as a fused quartz tube shown in FIG. 2A. Additional reaction chambers can also be envisioned.

In some embodiments, the reaction chamber may be placed under a stream of a reductive gas. In some embodiments, the reductive gas is hydrogen. In some embodiments, the reductive gas in the reaction chamber has a flow rate ranging from about 10 sccm to about 1000 sccm. In some embodiments, the reductive gas in the reaction chamber has a flow rate of about 300 sccm. In some embodiments, the reductive gas in the reaction chamber has a pressure ranging from about 5 Torr to about 800 Torr. In some embodiments, the reaction chamber is placed under a stream of a reductive gas during the carbon source applying step, the growing step, or both.

Mechanism of Growth

Without being bound by theory, various mechanisms may be utilized to grow the Bernal-stacked graphene layers of the present disclosure on catalyst surfaces. For instance, in some embodiments, the methods of the present disclosure may not utilize an independent homoexpitaxial layer-by-layer growth. In some embodiments, the methods of the present disclosure may utilize a simultaneous-seeding and self-limiting process to grow Bernal-stacked graphene layers. For instance, in some embodiments, the growing occurs from multiple growth centers. In some embodiments, the growth centers include multilayer graphene seeds. In some embodiments, the growth centers grow laterally and epitaxially and merge seamlessly to form the Bernal-stacked graphene layers of the present disclosure.

In some embodiments, multilayer graphene seeds form when the carbon source on a surface of a catalyst is supersaturated. In some embodiments, higher carbon source pressure deposits thicker multilayer graphene seeds. The thickness of the graphene may then be pre-defined by these multilayer graphene seeds, which grow epitaxially along the surface of the catalyst.

Controllable Growth of Bernal-stacked Graphene Layers

In some embodiments, the number of formed Bernal-stacked graphene layers is controllable as a function of one or more growth parameters. In some embodiments, the methods of the present disclosure also include a step of controlling the number of Bernal-stacked graphene layers by adjusting or maintaining one or more growth parameters. In some embodiments, the one or more growth parameters may include at least one of total pressure of the reaction chamber, pressure of the carbon source in the reaction chamber, pressure of a reductive gas in the reaction chamber, a ratio of reductive gas pressure to carbon source pressure in the reaction chamber, a reductive gas flow rate in the reaction chamber, growth temperature, growth time, a cooling rate of the surface of the catalyst after the growing step, and combinations thereof.

In some embodiments, the one or more controllable growth parameters includes a pressure of the carbon source in the reaction chamber. In some embodiments, an increase in the pressure of the carbon source increases the number of Bernal-stacked graphene layers, and a decrease in the pressure of the carbon source decreases the number of Bernal-stacked graphene layers. In some embodiments, the pressure of the carbon source is controlled at a range from about 0.2 Torr to about 30 Torr. In some embodiments, the one or more controllable growth parameters includes a pressure of a reductive gas in the reaction chamber. In some embodiments, an increase in the pressure of the reductive gas increases the number of Bernal-stacked graphene layers, and a decrease in the pressure of the reductive gas decreases the number of Bernal-stacked graphene layers. In some embodiments, the pressure of the reductive gas is controlled at a range from about 5 Torr to about 750 Torr.

In some embodiments, the one or more controllable growth parameters include a total pressure of the reaction chamber. In some embodiments, an increase in the total pressure of the reaction chamber increases the number of Bernal-stacked graphene layers, and a decrease in the total pressure of the reaction chamber decreases the number of Bernal-stacked graphene layers. In some embodiments, the total pressure of the reactive chamber is controlled at a range from about 5 Torr to about 800 Torr.

In some embodiments, the one or more controllable growth parameters includes a ratio of a reductive gas pressure to a carbon source pressure in the reaction chamber. In some embodiments, the ratio is maintained at a steady number. In some embodiments, the ratio is maintained at about 28.

In some embodiments, the one or more controllable growth parameters includes a combination of a pressure of the carbon source in the reaction chamber, a pressure of a reductive gas in the reaction chamber, a total pressure of the reaction chamber, and a ratio of a reductive gas pressure to a carbon source pressure in the reaction chamber.

Growth Termination

In some embodiments, the methods of the present disclosure also include a step of terminating the step of growing Bernal-stacked graphene layers. Various methods may be utilized to terminate the growth of Bernal-stacked graphene layers. For instance, in some embodiments, the growth of Bernal-stacked graphene layers is terminated by cooling the surface of the catalyst. In some embodiments, the cooling occurs by moving the catalyst surface away from a heat source, such as a furnace. In some embodiments, the cooling occurs by exposing the catalyst surface to a stream of a reductive gas, such as hydrogen.

Transfer

In some embodiments, the methods of the present disclosure may also include a step of transferring the formed Bernal-stacked graphene layers from the surface of the catalyst onto a substrate, such as a $SiO_2$/Si wafer. Various methods may be utilized to transfer Bernal-stacked graphene layers from the surface of the catalyst onto a substrate. In some embodiments, such methods may include, without limitation, thin layers protection, acid-etching, layers lift off, and combinations thereof.

Formed Bernal-stacked Graphene Layers

The methods of the present disclosure may be utilized to form various types of Bernal-stacked graphene layers. For instance, in some embodiments, the formed Bernal-stacked graphene layers have from 2 to 10 Bernal-stacked graphene layers. In some embodiments, the formed Bernal-stacked graphene layers have from 2 to 4 Bernal-stacked graphene layers. In some embodiments, the formed Bernal-stacked graphene layers have 2 Bernal-stacked graphene layers. In some embodiments, the formed Bernal-stacked graphene layers have 3 Bernal-stacked graphene layers. In some embodiments, the formed Bernal-stacked graphene layers have 4 Bernal-stacked graphene layers. In some embodiments, the formed Bernal-stacked graphene layers have more than 10 Bernal-stacked graphene layers.

The formed Bernal-stacked graphene layers of the present disclosure may also be in various forms and sizes. For instance, in some embodiments, the formed Bernal-stacked graphene layers may be in polycrystalline form. In some embodiments, the formed Bernal-stacked graphene layers may have a uniform structure. In some embodiments, the formed Bernal-stacked graphene layers may have domain sizes ranging from about 1 μm to about 5 μm.

Bernal-stacked Graphene Films

Further embodiments of the present disclosure pertain to Bernal-stacked graphene films. In some embodiments, the Bernal-stacked graphene films of the present disclosure are formed by the methods of the present disclosure. In some embodiments, the Bernal-stacked graphene films of the present disclosure include a plurality of Bernal-stacked graphene layers. In some embodiments, the Bernal-stacked graphene layers are uniform in structure. In some embodiments, the Bernal-stacked graphene layers are in polycrystalline form. In some embodiments, the Bernal-stacked graphene layers have domain sizes ranging from about 1 μm to about 5 μm.

In some embodiments, the Bernal-stacked graphene films of the present disclosure have from 2 to 10 Bernal-stacked graphene layers. In some embodiments, the Bernal-stacked graphene films of the present disclosure have from 2 to 4 Bernal-stacked graphene layers. In some embodiments, the Bernal-stacked graphene films of the present disclosure have 2 Bernal-stacked graphene layers. In some embodiments, the Bernal-stacked graphene films of the present disclosure have more than 10 Bernal-stacked graphene layers.

Applications and Advantages

In some embodiments, the present disclosure provides effective, scalable, and controllable methods of forming Bernal-stacked graphene layers that show distinct electronic band structures. As such, Applicants envision that the methods of the present disclosure can provide effective methods for making graphene films for numerous applications, including physical and optoelectronic applications.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

EXAMPLE 1

Preparation of Large-Area Bernal-Stacked Bi-, Tri-, and Tetralayer Graphene

In this Example, Applicants demonstrate that large-area uniform Bernal-stacked bi-, tri-, and tetralayer graphene films were successfully synthesized on a Cu surface in selective growth windows, with a finely tuned total pressure and $CH_4/H_2$ gas ratio. Based on the analyses obtained, the growth mechanism is not an independent homoexpitaxial layer-by-layer growth, but most likely a simultaneous-seeding and self-limiting process.

In this Example, Applicants demonstrate consistent chemical vapor deposition (CVD) growth windows for large-area Bernal-stacked bi-, tri-, or tetralayer graphene on Cu surfaces. Without being bound by theory, Applicants have demonstrated that parameters that could affect the thickness of graphene growth include the pressure in the system, gas flow rate, growth pressure (the partial pressure of both the growth gas and the carrier gas), growth temperature, and cooling rate. Based on previous CVD growth conditions for monolayer, bilayer, and multilayer graphene (summarized in Table 1), Applicants hypothesized that the partial pressure of both the carbon sources and the $H_2$ gas in the growth process, which is set by the total pressure and the mole fraction of the feedstock, could be a factor that controls the thickness of the graphene.

TABLE 1 provides a graphene growth summary from the literature. Some of the studies reported the flow rates (sccm) of $H_2$ and $CH_4$ and the total growth pressure for the growth conditions. These have been converted into partial pressure.

| Entry | Growth pressure (Torr) | Growth Temperature (° C.) | $H_2$ pressure (Torr) | $CH_4$ pressure (Torr) | Notes |
|---|---|---|---|---|---|
| 1 | 760 | 1050 | 24.5 | 0.006 | monolayer single crystal |
| 2 | 760 | 1000 | 76 | 0.068 | monolayer no D peak |
| 3 | 760 | 1000 | 76 | 3 | multilayer no D peak |
| 4 | 760 | 1000 | 707.25 | 62.75 | multilayer with D peak |
| 5 | 0.2 | 1035 | 0.04 | 0.16 | monolayer no D peak |
| 6 | 0.45 | 1000 | 0 | 0.45 | bilayer with D peak |

Therefore, a series of experiments with continual and precisely controlled total pressure and ratio of growth gases was performed to generate a coherent growth map, as shown in Table 2.

TABLE 2 provides growth conditions in the CVD system used in this Example.

| Sample | Growth pressure (Torr) | Growth Temperature (° C.) | $H_2$ pressure (Torr) | $CH_4$ pressure (Torr) | Thickness |
|---|---|---|---|---|---|
| 1 | 5.8 | 1000 | 5.6 | 0.2 | monolayer |
| 2 | 11.6 | 1000 | 11.2 | 0.4 | monolayer |
| 3 | 23.2 | 1000 | 22.4 | 0.8 | monolayer |
| 4 | 46.4 | 1000 | 44.8 | 1.6 | 1-2 layer |
| 5 | 93.3 | 1000 | 89.5 | 3.6~3.8 | bilayer |
| 6 | 139.2 | 1000 | 134.4 | 4.8 | 2-3 layer |
| 7 | 152 | 1000 | 146.7 | 5.2 | 3 layer |
| 8 | 185.6 | 1000 | 179.2 | 6.4 | 3-4 layer |
| 9 | 277.6 | 1000 | 268.8 | 9.6 | 4 layer |
| 10 | 370 | 1000 | 358.4 | 12.8 | >5 layer |
| 11 | 555 | 1000 | 537.6 | 19.2 | >10 layer |
| 12 | 740 | 1000 | 716.8 | 25.6 | >10 layer |

Figure 2:
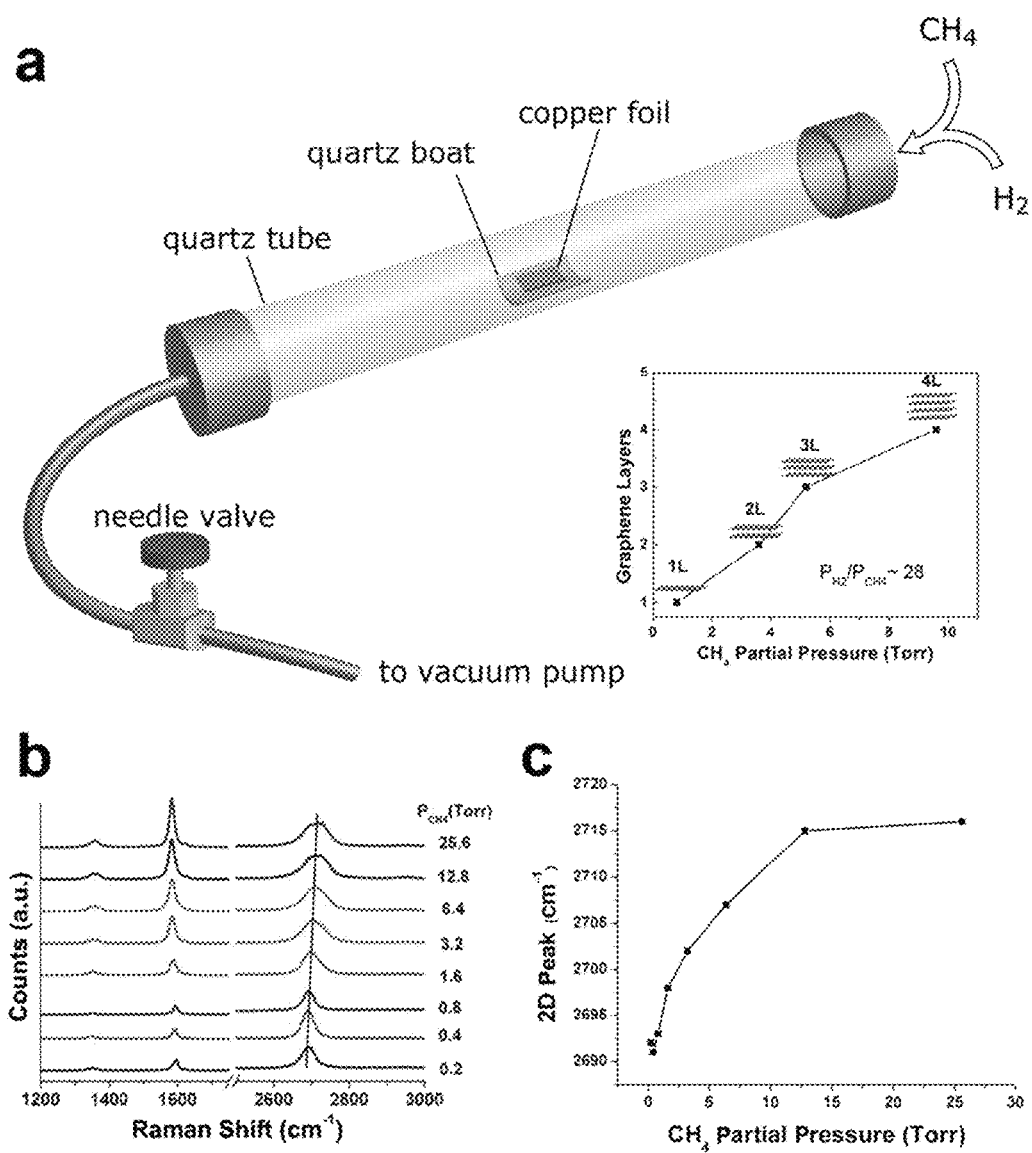
FIG. 2 provides schemes and data relating to the growth of Bernal-stacked graphene layers.
Figure 3:
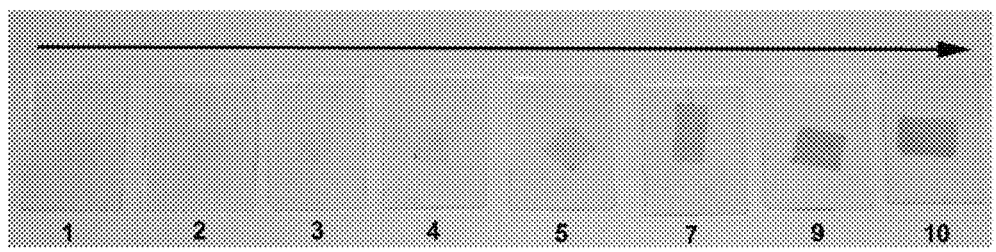
FIG. 3 shows optical photographs of graphene films transferred onto quartz substrates (~0.67 in$^2$). The arrow begins at the monolayer graphene Sample 1 and ends at the multilayer graphene Sample 10 (as summarized in Table 2 in Example 1). The CH$_4$ partial pressure increases from 0.2 Torr to 12.8 Torr (as also summarized in Table 2 in Example 1).

As shown in FIG. 2, a needle valve was installed between the CVD growth chamber (a quartz tube) and the vacuum pump to precisely control the gas flow rate and thus the total pressure of the CVD system. The total pressure was carefully monitored with a pressure gauge connected to the growth chamber. In Table 2, a monolayer graphene growth condition was set as the first data point in the series (Sample 1). The growth reaction was maintained at 1000° C. for 15 min. The flow rates of $H_2$ and $CH_4$ were 300 sccm and 10±1 sccm, respectively. The flow rates were kept the same throughout this series (Samples 1-12). The ratio between $H_2$ and $CH_4$ was thus fixed, while the total pressure was tuned from 5.8 Torr to 740 Torr, ranging from low pressure growth to near-atmospheric pressure growth. The partial pressures of $H_2$ ($P_{H2}$) and $CH_4$ ($P_{CH4}$) were calculated from the total system pressure. The detailed growth parameter values are listed in Table 2. As the growth pressure increased, thicker graphene films grew on the Cu surfaces. Specifically, bi-, tri-, and tetralayer graphene films form when the $P_{CH4}$ was 3.6, 5.2, and 9.6 Torr, respectively (inset of FIG. 2A).

All of the graphene films were grown and transferred onto different substrates using the method previously described (Sun et al., *Nature* 2010, 468, 549-552). Optical images of this series transferred onto quartz slides are shown in FIG.

3. The graphene films became successively darker, suggesting that thicker films were grown with increasing $P_{CH4}$. The thickness of the films was subsequently investigated using spectroscopic techniques. Raman spectroscopy was used to determine both the quality and thickness of the graphene film over a micron-sized area according to the laser spot-size. Based on the Raman spectra in FIG. 2B, when the $P_{CH4}$ is below 1.6 Torr, only monolayer graphene films grow with an $I_{2D}/I_G$ ratio less than 0.5 (Samples 1-3). At 1.6 Torr, bilayer graphene starts to form on Cu surfaces as the average $I_G/I_{2D}$ increases to ~0.5, slightly higher than monolayer graphene $I_G/I_{2D}$ ratio. Sample 4 is a hybrid of mono- and bilayer graphene film as confirmed by optical absorption of ~3%. When $P_{CH4}$ was 3.6~3.8 Torr, Sample 5, the graphene film displays a dominant bilayer characteristic $I_G/I_{2D}$ ratio over a large area. Thicker graphene Raman signatures (3 to 10 layers) are also observed on the graphene film from Samples 6-10.

FIG. 2B displays the stacked Raman spectra as the $P_{CH4}$ increased. The G peak at ~1585 cm$^{-1}$ becomes more pronounced and the 2D peak at ~2700 cm broadens and blue shifts. In FIG. 2C, the 2D peak blue shift starts at 2690 cm$^{-1}$ for monolayer graphene and ends at ~2717 cm$^{-1}$ for >10-layer graphene, or graphite. This result is consistent with the results obtained from mechanically exfoliated Bernal graphene.

Figure 4:
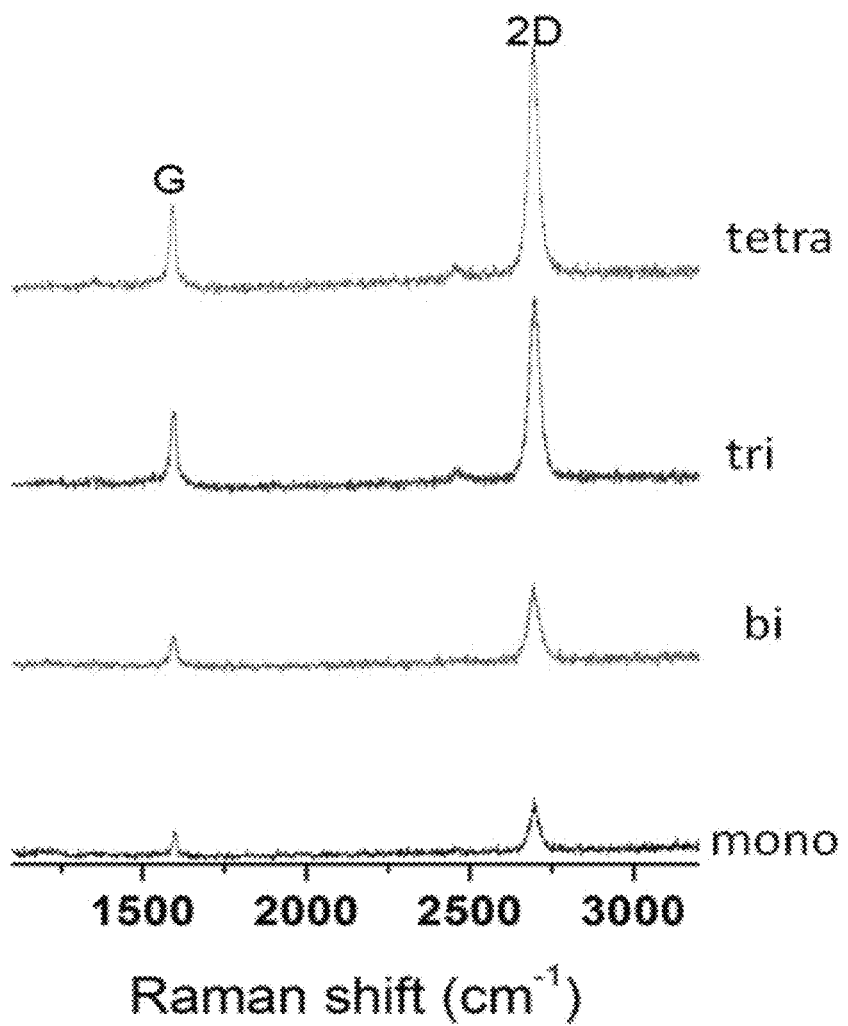
FIG. 4 shows Raman spectra of monolayer graphene and non-Bernal-stacked bi-, tri-, and tetralayer graphene with 514 nm excitation. In order to prepare the non-Bernalstacked few-layer graphene, monolayer samples grown at CH$_4$ partial pressure of 0.2 Torr (Sample 1, Table 2) were transferred layer-by-layer onto a quartz surface (a PMMA-protected graphene layer was transferred onto the quartz surface and the PMMA was removed with acetone and rinsed with isopropanol; this process was repeated for multiple layers). No annealing was performed before the Raman characterization.
Figure 5:
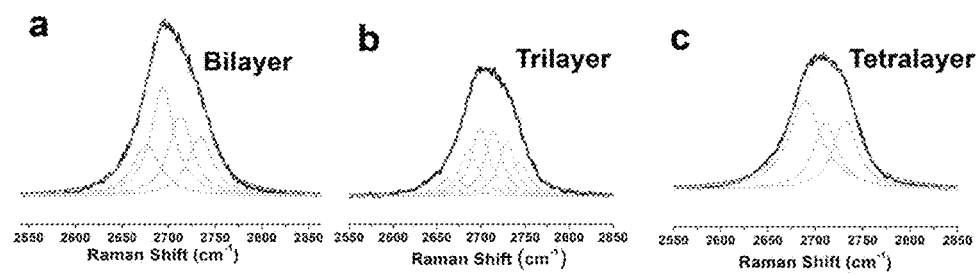
FIG. 5 shows the fitted Raman 2D band of bi-layer (FIG. 5A), tri-layer (FIG. 5B), and tetralayer (FIG. 5C) graphene with full width at half maximum values (FWHMs) of 69, 71 and 72 cm$^{-1}$, respectively.

The Raman spectra of non-Bernal stacked graphene were also investigated by directly stacking monolayer CVD graphene films atop a SiO$_2$ surface without further annealing. As shown in FIG. 4, both the $I_{2D}$ and $I_G$ increase as the thickness increases, while the relative ratio between the two peaks does not change, suggesting a relatively weak electronic interaction between graphene layers. The deconvolution of the 2D peaks of bi-, tri-, and tetralayer graphene unveils more details, as shown in FIG. 5. The 2D peak of bilayer graphene can be fitted with 4 Lorentzian curves while the 2D peak in trilayer graphene can be fitted with 6 Lorentzian curves. The line shape of the peak shows little asymmetry with no apparent shoulder, which suggests that the graphene films are dominated by Bernal (ABA) stacking order rather than rhombohedral (ABC) stacking order. The tetralayer graphene's 2D peak can be fitted with 3 Lorentzian curves and its symmetrical line shape reveals its Bernal (ABAB) stacking signature. The full width at half maximum values (FWHMs) of the 2D peaks are 62, 71 and 72 cm$^{-1}$ in bi-, tri-, and tetralayer graphene, respectively, which are significantly broader than the FWHM of monolayer graphene at 30 cm$^{-1}$. All Raman spectra were acquired using a 514 nm laser at room temperature on SiO$_2$/Si substrates.

Selected area electron diffraction (SAED) patterns and high resolution transmission electron microscopy (HRTEM) images corroborate graphene's stacking order and thickness. Bi-, tri-, and tetralayer graphene films were carefully transferred onto TEM grids (Ted Pella, Quantum foil). Over ~2 mm$^2$, ~10 SAED patterns were acquired per sample and each area showed one set of diffraction pattern characteristic of Bernal stacking, other than at the grain boundaries. In the SAED patterns, the (1-210) intensity was 3.5~6.3 times stronger than the (1-100), as shown in FIGS. 6A-F. The results suggest that these films are non-AA stacked.

Figure 6:
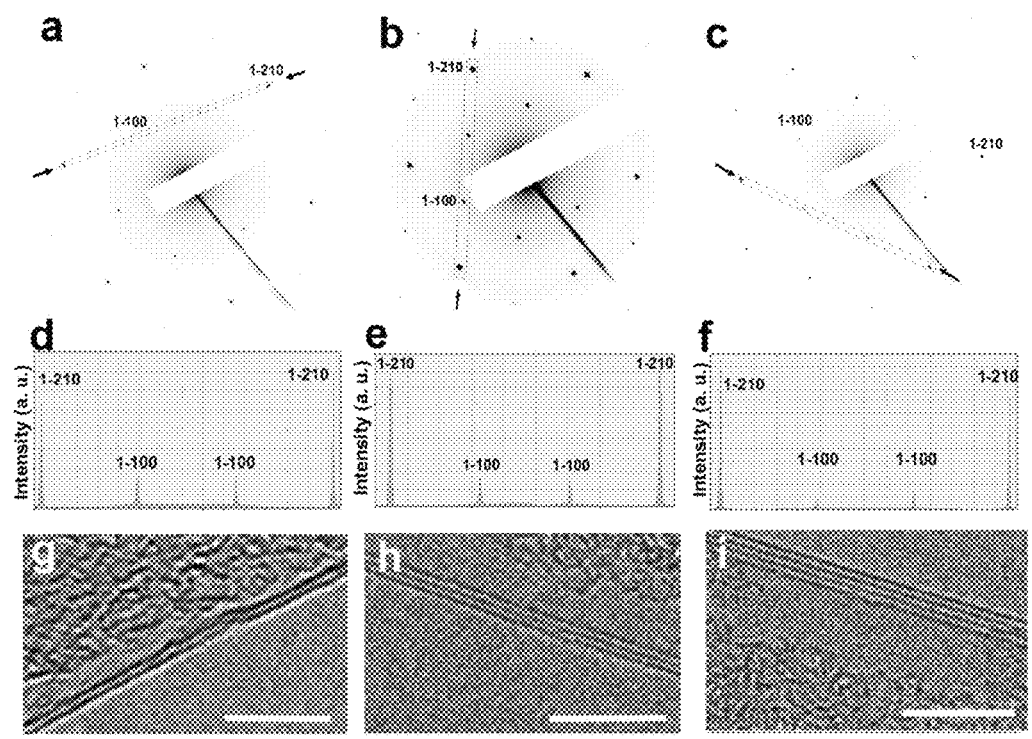
FIG. 6 shows selected area electron diffraction (SAED) patterns and transmission electron microscopy (TEM) images of bi-, tri-, and tetralayer graphene.
Figure 7:
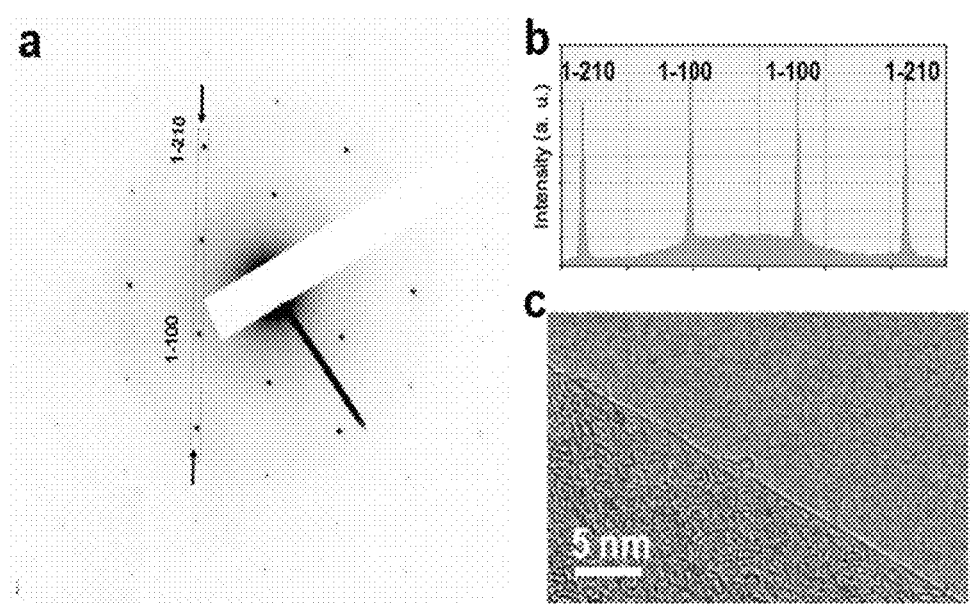
FIG. 7 shows SAED (FIGS. 7A-B) and HRTEM (FIG. 7C) edge characterization of monolayer graphene.

As a reference, the monolayer graphene diffraction pattern has a (1-210)/(1-100) intensity ratio of ~0.87 (FIG. 7). The presence of the innermost diffraction spots (1-100) and the diffraction intensity ratio in FIG. 6 is quite different from the ABC stacking order, which should have an intensity ratio larger than 14 according to theoretical calculations. Without being bound by theory, the inner plane strain and small tilting angle from the imperfect wet-transfer method could affect the diffraction intensities.

Using the SAED patterns, the graphene films are Bernal (AB) stacked polycrystalline graphene with an average domain size of 1 to 5 µm. This result has the potential to be optimized into a single crystal using newly developed methods (Zhang et al., *Nat. Mater* 2011, 10, 443-449). In FIGS. 6G-I, edges were randomly chosen for imaging to confirm the thickness of the bi-, tri-, and tetralayer graphene samples.

Figure 8:
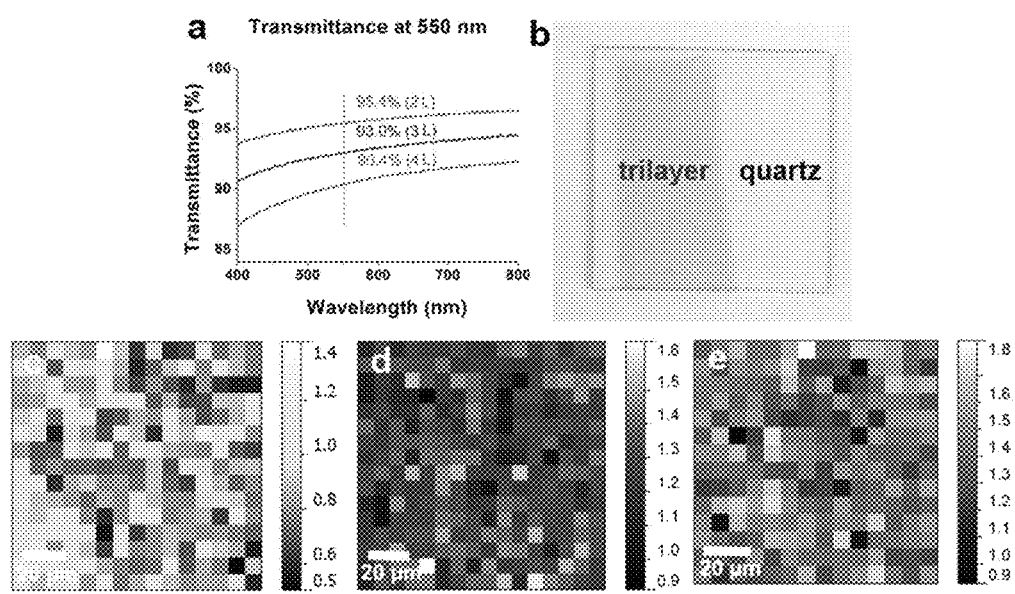
FIG. 8 shows spectroscopic characterization of Bernal bi-, tri-, and tetralayer graphene films.
Figure 9:
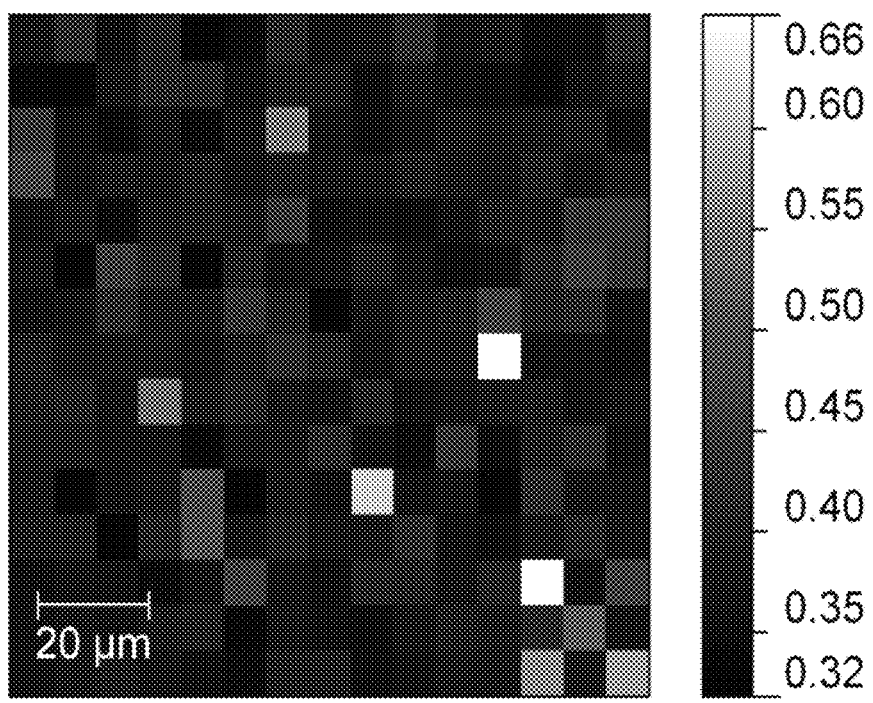
FIG. 9 shows the Raman mapping of monolayer graphene (Sample 1, Table 2).

The thickness of the graphene films was evaluated using visible spectroscopy in FIG. 8A. At 550 nm, the bi-, tri-, and tetralayer graphene films on quartz substrates exhibit transmittances of 95.4%, 93.0%, and 90.4%, respectively, in good agreement with predicted and reported values. FIG. 8B shows no difference in contrast across the trilayer graphene film, providing evidence for the uniformity of the film. Statistically, Raman mapping at the 100×100 µm$^2$ scale confirms the thickness and uniformity of graphene films. In a typical monolayer graphene film, more than 95% of the graphene area has an $I_G/I_{2D}$ ratio <0.5 (FIG. 9). In FIG. 8C, no monolayer Raman signature ($I_G/I_{2D}$<0.5) was observed at any pixel on the map and ~85% of the film had an $I_G/I_{2D}$ ratio of 0.7-1.1, suggesting uniform bilayer graphene. The Raman 2D band has been shown to be sensitive to graphene interlayer coupling, whereby ordered few-layer graphene exhibits 2D band-broadening in addition to a shift to higher frequency.

Figure 10:
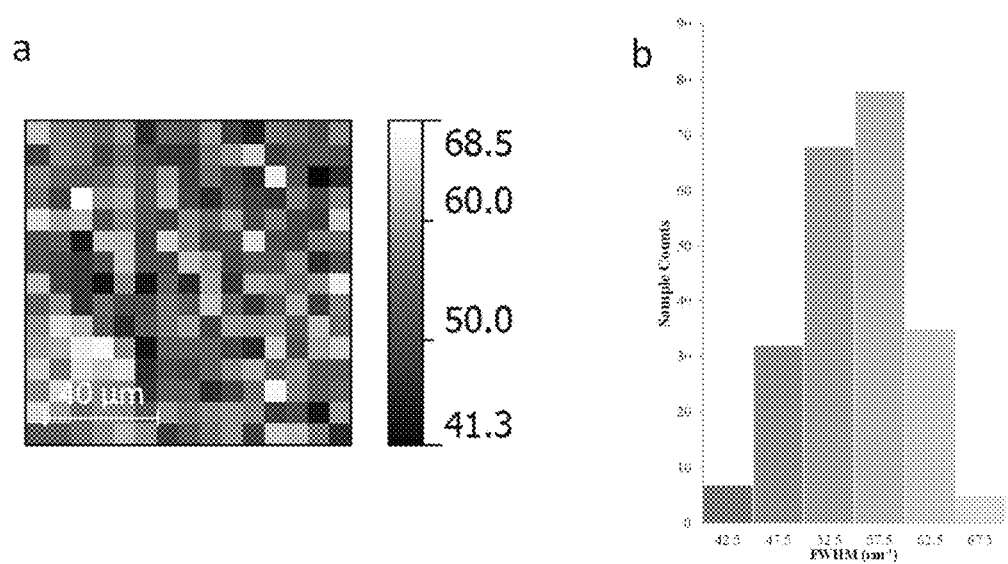
FIG. 10 shows the FWHM of 2D band mapping (FIG. 10A) and histogram (FIG. 10B) of a bilayer graphene film.

In FIG. 10, ~85% of the sample's FWHM 2D peak falls within 42.5 cm$^{-1}$ and 62.5 cm$^{-1}$, characteristic of strongly coupled bilayer graphene. Without being bound by theory, it is envisioned that substrate effects or incidental charging could contribute to the deviation in the ratio. In FIGS. 8D-8E, the average $I_G/I_{2D}$ ratios were 1.29 (trilayer) and 1.44 (tetralayer), respectively. This result was similar to tri- and tetralayer Bernal-stacked exfoliated graphene (obtained from highly oriented pyrolytic graphite), while it is different than the previous values for CVD-grown graphene.

Figure 11:
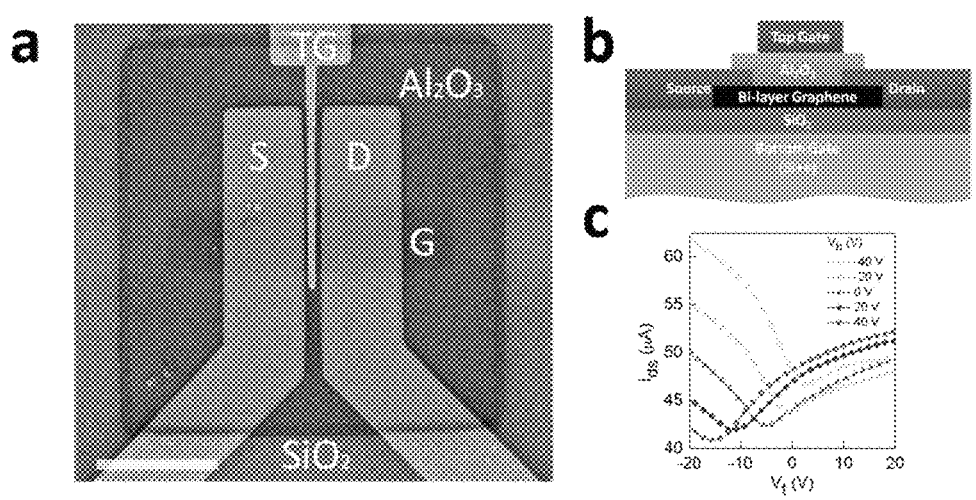
FIG. 11 shows electrical measurements of Bernal-stacked bilayer graphene.
Figure 12:
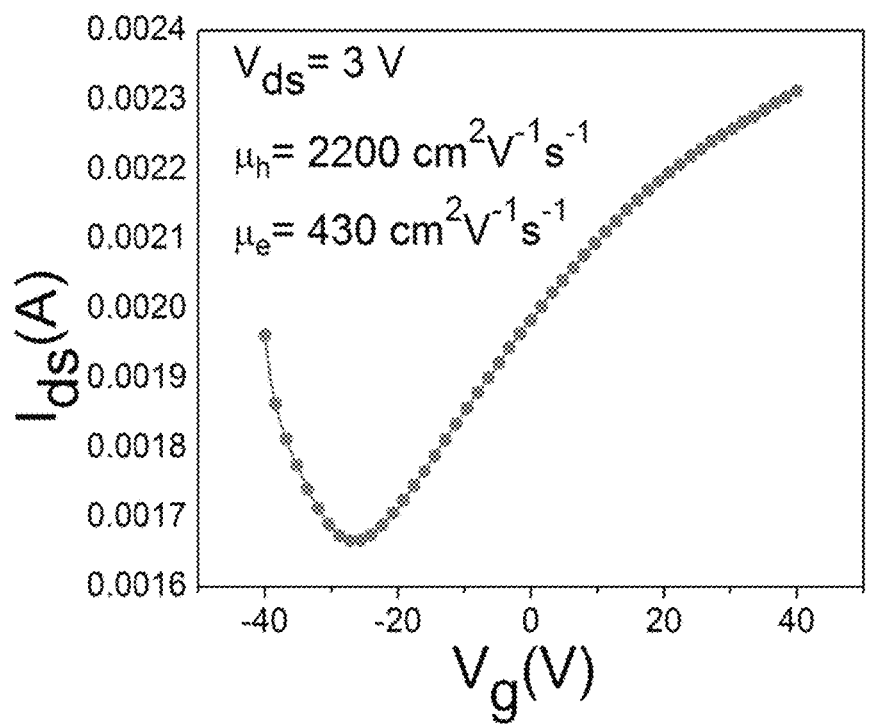
FIG. 12 shows room temperature Bernal bilayer graphene device mobility.

Dual-gate field effect transistors (FETs) were built with a bilayer graphene film atop a SiO$_2$/Si wafer (FIG. 11). The electrical measurements on the devices indicate that they have a tunable band structure with a biased electrical field perpendicular to the graphene basal plane. The device hole mobility was as high as ~2200 cm$^2$V$^{-1}$s$^{-1}$ (FIG. 12), which is considerably higher than the mobility for solution-exfoliated Bernal bilayer graphene.

Figure 13:
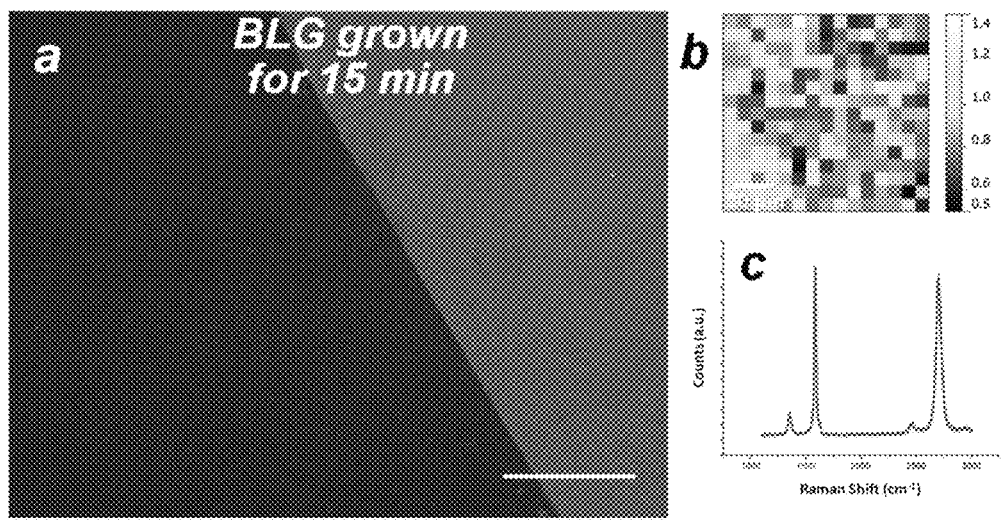
FIG. 13 shows a characterization of the graphene film sample as used in FIG. 8C.
Figure 14:
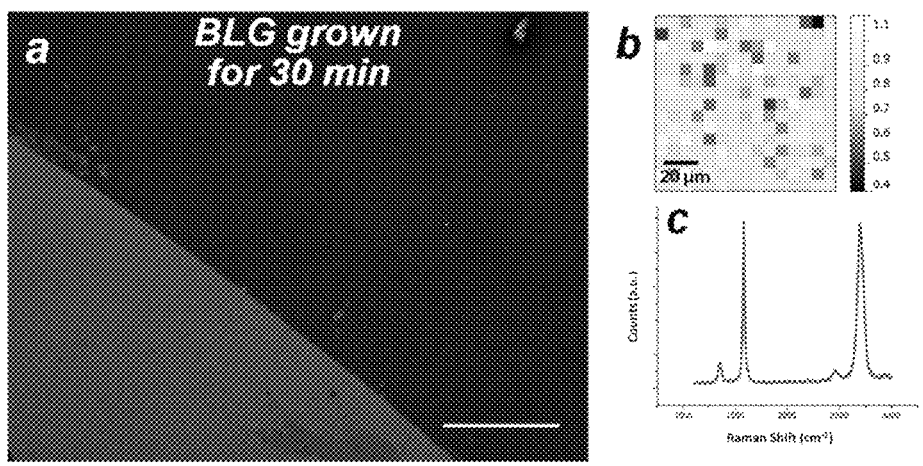
FIG. 14 shows another characterization of the graphene film sample as used in FIG. 8C.
Figure 15:
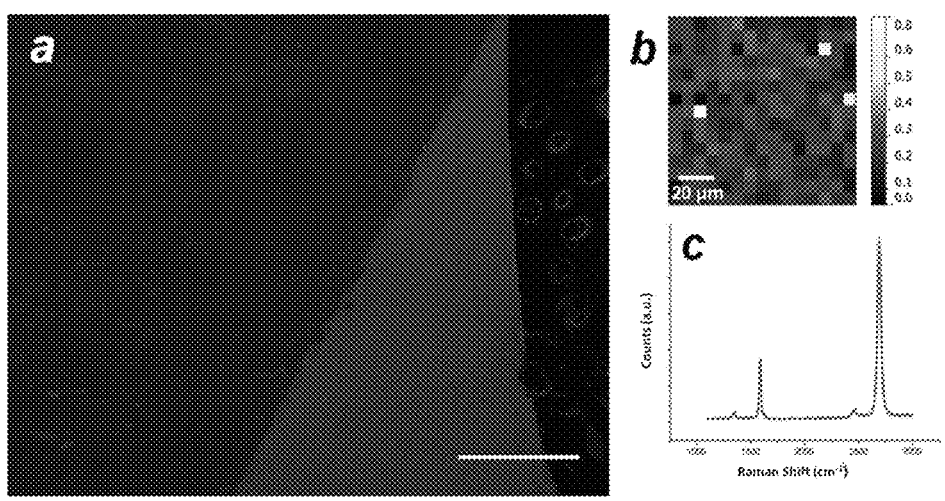
FIG. 15 shows additional data related to bilayer graphene growth.

Additional control experiments were done to explore the growth mechanism for the Bernal stacked graphene films. Under bilayer growth conditions (Sample 5 in Table 2), 15-min-growth produces full coverage of a bilayer graphene film on the Cu surface. Extending the growth time to 30 min under the same conditions does not change the film's thickness (FIGS. 13-14). In addition, monolayer graphene was grown to fully cover the Cu surface, after which the CVD system was changed to a higher pressure favorable for bilayer growth. However, no additional growth was observed (FIG. 15). This confirmed that the graphene growth is not a layer-by-layer mechanism, in which an additional graphene layer can grow directly atop or underneath existing graphene layers. The polycrystalline nature indicates that the graphene is grown from multiple growth centers and that the crystals subsequently merge seamlessly. The growth of the Bernal stacked graphene suggests that a self-limiting mechanism is operating and that the thickness is stems from its early seeding stage.

Figure 16:
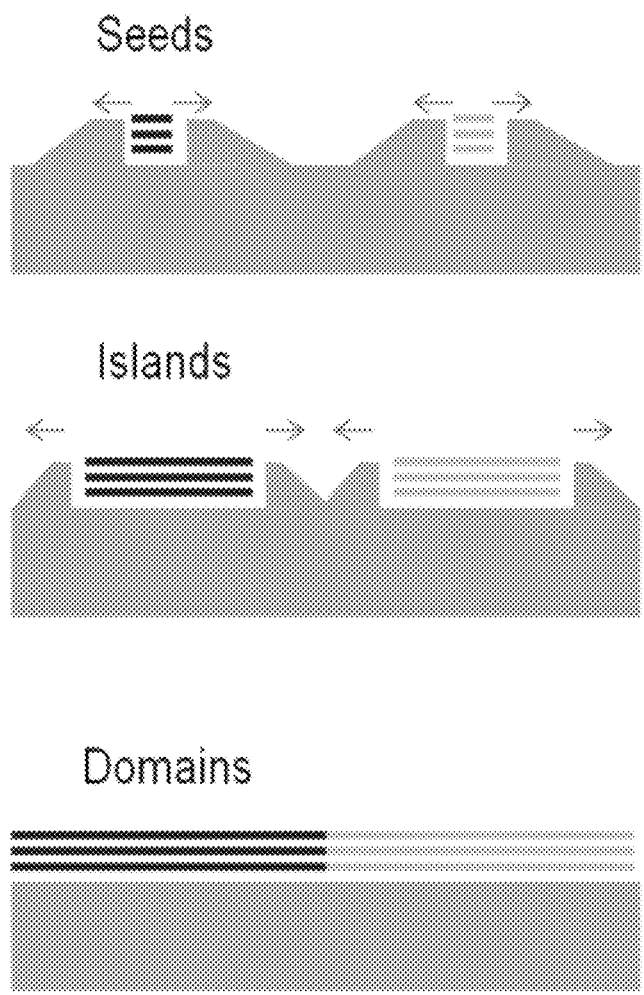
FIG. 16 provides proposed growth-mechanisms for Bernal-stacked graphene layers. In this illustration, graphene seeds form when the surface carbon in Cu is supersaturated. Higher CH$_4$ partial pressure deposits thicker graphene seeds. The thickness of the graphene is pre-defined by these seeds, which grow epitaxially along the Cu surface (top). The graphene seeds grow independently and form graphene single-crystalline islands (middle) before they meet with each other. When graphene islands meet, they form domains and grain boundaries (bottom) and the growth stops. No additional graphene layer would be able to grow on the fully covered Cu surface.

Without being bound by theory, the proposed growth-mechanism scheme is shown in FIG. 16. In a concentrated carbon species growth environment, multilayer graphene seeds form when C atoms are supersaturated in the surface layers of the Cu. In order to arrest the intermediate states, a short time-growth (2 min) on pre-treated Cu surface was performed. The Cu foil was pre-polished and annealed using the same method discussed elsewhere (Yan et al., Towards the Synthesis of Wafer-Scale Single-Crystal Graphene on Copper Foils, *ACS Nano* 2012, 6, 9110-9117. DOI: 10.1021/nn303352k)

Figure 17:
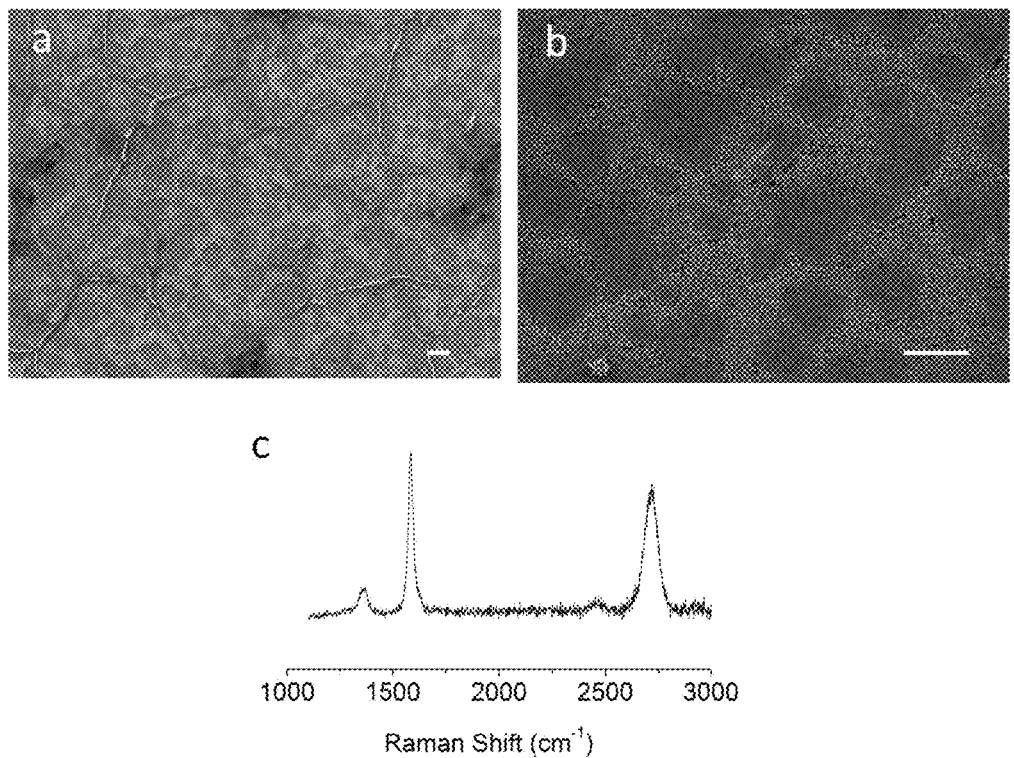
FIG. 17 provides data and images of bilayer graphene seeds.
Figure 18:
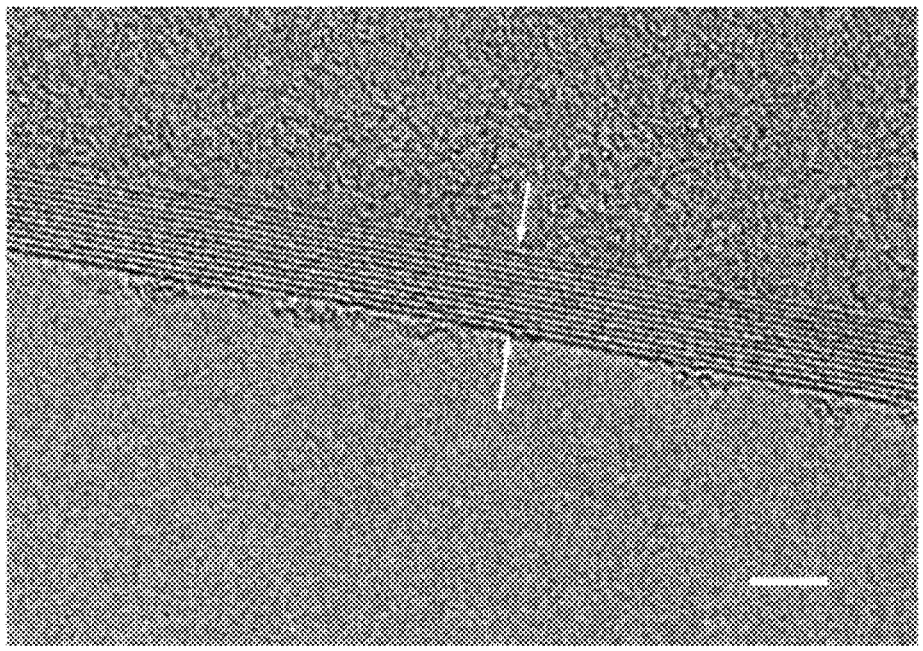
FIG. 18 is an SEM image of a graphite film with graphene thickness over 10 layers (Sample 11, Table 2). Scale bar is 5 nm.

In FIG. 17, the SEM and Raman spectra clearly confirmed that the graphene thickness was defined at the initial stage. Considering the top graphene layers have no direct lateral contact with the Cu underneath except for the edges, this two-dimensional growth is most likely catalyzed by the Cu catalyst-front close to the graphene edges as shown in FIG. 16. In this way, some of the seeds grow into graphene islands, forming and extending synchronously rather than layer-by-layer. The islands maintain their thickness and stacking order while the edges propagate laterally on the Cu surface. In analogy to the "tip-growth" mechanism of carbon nanotubes, the growth of Bernal graphene is most likely following an "edge-growth" mechanism. Cu "wave fronts" are pushed back into the surface by growing graphene crystals or they evaporate from this surface mobile state. As the graphene islands expand, the open Cu area shrinks. Finally, two graphene domains merge into one, with no Cu-front left in-between. As the growth temperature is close to copper's melting point, the front of the catalyst could be a highly mobile liquid phase. This mechanism is proposed for Bernal-stacked graphene growth. But it could be generalized for all 2D graphitic growth on Cu, including monolayer graphene and graphite (>10 layers). With the same mechanism, Bernal-stacked graphite of more than 10 graphene layers could be produced from Cu substrates (FIG. 18).

EXAMPLE 1.1

CVD Growth

In a 48-inch-long fused quartz tube (22-mm ID, 25-mm OD, Technical Glass Products) heated in a furnace, graphene films were grown on a ~1 in$^2$ copper foil mounted on a boat-shaped quartz holder with a magnet affixed at one end to facilitate insertion and removal (the magnet never enters to hot-zone of the oven). With the furnace heated to 1000° C. and tube under vacuum (<30 mTorr), filtered H$_2$ (ultra-high purity grade, 99.999% from Matheson) was introduced at 300 sccm and the H$_2$ pressure was controlled with a needle valve (FIG. 2A) to a specified value. The copper foil was then annealed for 10 min by sliding the holder containing the copper to the center of the furnace. In the presence of the pressure-controlled H$_2$, filtered methane (chemical purity grade, 99.0%, Matheson) was opened at 10±1 sccm for a growth time of 15 min after which the holder was removed from the furnace area of the tube to cool under H$_2$. The copper foil was 25 μm thick and 99.8% grade, purchased from Alfa Aesar.

EXAMPLE 1.2

Transfer

Graphene was formed on both sides of the Cu foil. In order to protect the graphene layers during Cu etching, a poly(methyl methacrylate) (PMMA) solution (950 PMMA A 4, MicroChem) was spin-coated (at 2500 rpm for 1 min) on the top of the graphene-coated copper foil twice and baked at 70° C. for ~30 min in a vacuum oven or on a hot plate. Marble's reagent was used as an aqueous etchant solution, comprising 15.6 g CuSO$_4$.5H$_2$O (Aldrich), 45 mL deionized H$_2$O, and 50 mL conc. HCl (Aldrich). The PMMA-graphene-Cu assembly was etched for a few min after which the Cu foil was removed from the Marble's reagent and dipped in water several times and wiped on a Kim wipe to completely remove the unprotected graphene on bottom of the Cu foil so that its residue did not merge with the top graphene. The remaining Cu was etched, leaving the PMMA-protected graphene that had been on top of the Cu foil floating on the etchant. The film was floated on deionized water and subsequently transferred onto a given substrate. The protective PMMA was removed using acetone after the transferred graphene layer completely dried. The graphene film was rinsed with 2-propanol, and gently blow-dried using N$_2$.

EXAMPLE 1.3

Characterization

For Raman spectroscopy, scanning electron microscopy (SEM), and optical characterization, graphene films were transferred onto a 300 nm SiO$_2$/Si substrate. Raman spectra and 2D Raman maps were collected using a Renishaw inVia Raman microscope with a 514 nm Ar laser at ambient temperature. SEM images were obtained with a JEOL 6500F SEM at 15 KV. Optical images were taken with a Zeiss Axioplan Polarized Optical Microscope. On quartz slides, optical transmittance spectra were collected in a Shimadzu UV-3101PC UV-VIS-NIR Spectrophotometer. Transmission electron microscopy (TEM) images and electron diffraction patterns were acquired using a JEOL 2100F field emission gun TEM at 200 kV. The diffraction patterns were obtained at 80,000× with a zero degree tilt. For the TEM experiments, graphene films were transferred onto C-flat TEM grids (Electron Microscopy Sciences) in a method similar to the transfer method used for silicon oxide substrates.

EXAMPLE 1.4

Electrical Measurement

The bilayer graphene sheet was transferred to p-Si substrates with 300 nm thermal oxide and patterned into a strip (5×20 μm) using ebeam lithography and reactive ion etching (RIE). The source/drain electrodes (1 nm Ti/20 nm Au) were defined using ebeam lithography and ebeam evaporation. Then top gate dielectrics (alumina, 70 nm) and top gate electrode (1 nm Ti/20 nm Au) were defined in series using ebeam lithography and ebeam evaporation. The channel length was between 1 μm and 5 μm depending on the devices.

The dual-gate FET properties of the bilayer graphene devices were further characterized using a probe station (Desert Cryogenics TTPX-probe 6 system) under vacuum with chamber base pressure below 1×10$^{-5}$ mm Hg. The I-V data were collected using an Agilent 4155C semiconductor parameter analyzer. The mobility was calculated using the following equation:

$$\mu = \frac{L}{WC_{ox}V_{sd}} \frac{\Delta I_{sd}}{\Delta V_g}$$

In the above equation, L and W are the channel length and width, $C_{ox}$ the gate oxide capacitance, $V_{sd}$ the source drain voltage, $I_{sd}$ the source drain current and $V_g$ the gate voltage. The linear regime of the transfer characteristics was used to obtain $\Delta I_{sd}/\Delta V_g$.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of controllably forming Bernal-stacked graphene layers, wherein the method comprises:
   cleaning a surface of a catalyst;
   annealing the surface of the catalyst;
   applying a carbon source onto the cleaned and annealed surface of the catalyst in a reaction chamber; and
   growing the Bernal-stacked graphene layers on the surface of the catalyst in the reaction chamber,
   wherein the method further comprises controlling the number of formed Bernal-stacked graphene layers by controlling at least the following growth parameters:
   (a) a total pressure of the reaction chamber,
      wherein the controlling of the total pressure comprises adjusting the total pressure; and
   (b) a ratio of reductive gas pressure to carbon source pressure in the reaction chamber,
      wherein the controlling of the ratio comprises maintaining the ratio at a fixed number,
   wherein an increase in the total pressure of the reaction chamber at the maintained ratio of reductive gas pressure to carbon source pressure in the reaction chamber increases the number of Bernal-stacked graphene layers, and
   wherein a decrease in the total pressure of the reaction chamber at the maintained ratio of reductive gas pressure to carbon source pressure in the reaction chamber decreases the number of Bernal-stacked graphene layers.

2. The method of claim 1, further comprising a step of placing the reaction chamber under a stream of a reductive gas.

3. The method of claim 2, wherein the reductive gas is hydrogen.

4. The method of claim 2, wherein the reductive gas has a pressure ranging from about 5 Torr to about 800 Torr.

5. The method of claim 2, wherein the reaction chamber is placed under the stream of the reductive gas at least during the applying step and the growing step.

6. The method of claim 1, wherein the catalyst is selected from the group consisting of Ni, Co, Fe, Pt, Au, Al, Cr, Cu, Mg, Mn, Mo, Rh, Si, Ta, Ti, W, U, V, Zr, and combinations thereof.

7. The method of claim 1, wherein the catalyst is a copper foil.

8. The method of claim 1, wherein the catalyst has a surface area ranging from about 1 $cm^2$ to about 10 $m^2$.

9. The method of claim 1, wherein cleaning the surface of the catalyst comprises electrochemical-polishing the surface of the catalyst.

10. The method of claim 1, wherein annealing the surface of the catalyst comprises thermal annealing.

11. The method of claim 10, wherein the thermal annealing comprises exposure of a catalyst surface to temperatures of at least about 1,000° C.

12. The method of claim 1, wherein the applying of the carbon source occurs by chemical vapor deposition.

13. The method of claim 1, wherein the carbon source is selected from the group consisting of hydrocarbons, polymers, non-polymeric carbon sources, small molecules, organic compounds, fullerenes, fluorenes, carbon nanotubes, phenylene, ethylenes, sucrose, sugars, polysaccharides, carbohydrates, proteins, and combinations thereof.

14. The method of claim 1, wherein the carbon source is a hydrocarbon.

15. The method of claim 14, wherein the hydrocarbon is methane.

16. The method of claim 1, wherein the carbon source has a pressure ranging from about 0.2 Torr to about 30 Torr.

17. The method of claim 1, wherein the growing occurs at temperatures of at least about 1,000° C.

18. The method of claim 1, wherein the growing occurs while the reaction chamber has a total pressure ranging from about 5 Torr to about 800 Torr.

19. The method of claim 1, wherein the growing occurs for less than about 15 minutes.

20. The method of claim 1, further comprising a step of terminating the growing step by cooling the surface of the catalyst.

21. The method of claim 1, further comprising a step of transferring the formed Bernal-stacked graphene layers from the surface of the catalyst onto a substrate.

22. The method of claim 1, wherein the growing occurs from multiple growth centers,
   wherein the growth centers comprise multilayer graphene seeds,
   wherein the growth centers grow laterally and epitaxially, and
   wherein the growth centers merge seamlessly to form Bernal-stacked graphene layers.

23. The method of claim 1, wherein the Bernal-stacked graphene layers have from 2 to 10 Bernal-stacked graphene layers.

24. The method of claim 1, wherein the Bernal-stacked graphene layers have more than 10 Bernal-stacked graphene layers.

25. The method of claim 1, wherein the Bernal-stacked graphene layers are in polycrystalline form.

26. The method of claim 1, wherein the Bernal-stacked graphene layers have domain sizes ranging from about 1 μm to about 5 μm.

27. The method of claim 1, wherein the growth parameters further comprise one or more growth parameters selected from the group consisting of a reductive gas flow rate in the reaction chamber, growth temperature, growth time, a cooling rate of the surface of the catalyst after the growing step, and combinations thereof.

28. The method of claim 1, wherein the controlling of the total pressure comprises adjusting the pressure of the carbon source in the reaction chamber, wherein an increase in the pressure of the carbon source increases the number of Bernal-stacked graphene layers, and wherein a decrease in the pressure of the carbon source decreases the number of Bernal-stacked graphene layers.

29. The method of claim 28, wherein the pressure of the carbon source is controlled at a range from about 0.2 Torr to about 30 Torr.

30. The method of claim 1, wherein the controlling of the total pressure comprises adjusting the pressure of a reductive gas in the reaction chamber, wherein an increase in the pressure of the reductive gas increases the number of Bernal-stacked graphene layers, and wherein a decrease in the pressure of the reductive gas decreases the number of Bernal-stacked graphene layers.

31. The method of claim 30, wherein the pressure of the reductive gas is controlled at a range from about 5 Torr to about 750 Torr.

32. The method of claim 1, wherein the total pressure of the reaction chamber is controlled at a range from about 5 Torr to about 800 Torr.

33. The method of claim 1, wherein the ratio of the reductive gas pressure to the carbon source pressure is maintained at about 28.

* * * * *